United States Patent
Bedu et al.

(10) Patent No.: US 7,662,500 B2
(45) Date of Patent: Feb. 16, 2010

(54) PACKAGE FOR A MINIATURE FUEL CELL

(75) Inventors: Yann Bedu, Fondettes (FR); Christophe Serre, St Cyr sur Loire (FR)

(73) Assignee: STMicroelectronics S.A., Montrouge (FR)

(*) Notice: Subject to any disclaimer, the term of this patent is extended or adjusted under 35 U.S.C. 154(b) by 83 days.

(21) Appl. No.: 11/962,939

(22) Filed: Dec. 21, 2007

(65) Prior Publication Data

US 2008/0160388 A1 Jul. 3, 2008

(30) Foreign Application Priority Data

Dec. 27, 2006 (FR) .................................. 06 55968

(51) Int. Cl.
*H01M 2/02* (2006.01)
*H01M 2/08* (2006.01)
*H01M 2/14* (2006.01)
*H01M 8/10* (2006.01)
*H01M 8/24* (2006.01)

(52) U.S. Cl. .............................. 429/34; 429/32; 429/36; 429/38

(58) Field of Classification Search .................... 429/26
See application file for complete search history.

(56) References Cited

U.S. PATENT DOCUMENTS

| | | | |
|---|---|---|---|
| 6,497,975 B2 * | 12/2002 | Bostaph et al. | ............... 429/38 |
| 2003/0059659 A1 | 3/2003 | Kamo et al. | |
| 2004/0146772 A1 | 7/2004 | Miyao et al. | |
| 2004/0161560 A1 | 8/2004 | Baranowski et al. | |
| 2005/0008918 A1 | 1/2005 | Nakakubo et al. | |
| 2006/0134470 A1 | 6/2006 | Kaye et al. | |

OTHER PUBLICATIONS

French Search Report from corresponding French Application No. FR 06/55968, filed Dec. 27, 2007.

* cited by examiner

*Primary Examiner*—Patrick Ryan
*Assistant Examiner*—Ashley Kwon
(74) *Attorney, Agent, or Firm*—Lisa K. Jorgenson; James H. Morris; Wolf, Greenfield & Sacks, P.C.

(57) ABSTRACT

A package for a fuel cell having an upper plate having a plurality of openings, the front surface of a cell element being intended to be received under each opening to close it, each cell element having a first pad and a second connection pad, each opening being provided with at least one crossbar connecting two sides of the opening, this crossbar having at least a conductive track portion having a first end connected to a pad of a first cell element and having a second end connected to a pad of a neighboring cell element.

15 Claims, 2 Drawing Sheets

PACKAGE FOR A MINIATURE FUEL CELL

BACKGROUND OF THE INVENTION

1. Field of the Invention

The present invention relates to a package for a miniature fuel cell.

2. Discussion of the Related Art

Miniature fuel cells are especially provided to equip many portable electronic devices such as computers, phones, music readers, etc.

Two fuel cell technologies have recently come up for low-power applications: so-called "PEMFC" cells using proton-exchange membranes and a hydrogen-based fuel (hydrogen, metal hydrides, etc.) sent to the anode, and so-called "DMFC" cells of similar structure but using liquid methanol as the fuel sent to the anode.

Independently from the fuel source, a function of which is to enable generating H+ ions and electrons (electric current) at the contact of a gas containing or generating oxygen in situ, a technology derived from microelectronics has been developed to form the cell core, which technology is especially usable with hydrogen.

Known cells are formed from a silicon substrate having micro-channels running through them through which gaseous hydrogen transits. This substrate supports successive thin layers comprising a catalyst layer, an electrolytic membrane, a diffusion layer, as well as two electrodes, one close to the substrate and the other one above the assembly of thin layers.

A cell or an assembly of miniature cells is thus formed, for example in the form of parallelepipedal wafers of low thickness here called fuel cell elements. To obtain desired cell features, several cell elements need to be assembled. Each cell element comprises, on its front surface, at least two apparent electric connection pads, the cell's positive and negative terminals. Generally, without for all this for it to be necessary, the arrival of the fluid or of the mixture of fluids, especially gaseous, containing or generating oxygen (especially, the ambient air) occurs on one of the (large) surfaces of the element and the arrival of the fluid or fluid mixture, especially gaseous, containing or generating hydrogen, occurs on the other (large) surface of the element.

SUMMARY OF THE INVENTION

There currently does not exist a simple package containing several fuel cell elements having an adapted shape to replace the cells or batteries which are used for nomadic uses, especially in microcomputers or portable phones. The present invention aims at forming a package improving at least certain prior art features.

To achieve all or part of these objects, as well as others, the present invention provides a package for a fuel cell comprising and upper plate having a plurality of openings, the front surface of a cell element being intended to be received under each opening to close it, each cell element having a first pad and a second connection pad, each opening being provided with at least one crossbar connecting two sides of the opening, this crossbar having at least a conductive track portion having a first end connected to a pad of a first cell element and having a second end connected to a pad of a neighboring cell element.

According to an embodiment of the present invention, the package defines a closed space on the side of the rear surfaces of the cell elements and comprises an access port to feed said space with fuel fluid.

According to an embodiment of the present invention, the pads and the ends of the conductive track portions are connected by a conductive glue.

According to an embodiment of the present invention, the upper plate is formed of two wafers of a plastic material between which the conductive tracks are sandwiched.

An embodiment of the present invention provides a fuel cell comprising a package such as hereabove and a plurality of cell elements series-connected by said conductive tracks.

According to an embodiment of the present invention, each cell element is glued under the corresponding opening.

According to an embodiment of the present invention, the cell comprises at least one holding spacer under at least one of the cell elements.

The foregoing and other objects, features, and advantages of the present invention will be discussed in detail in the following non-limiting description of specific embodiments in connection with the accompanying drawings.

DETAILED DESCRIPTION

Figure 1:
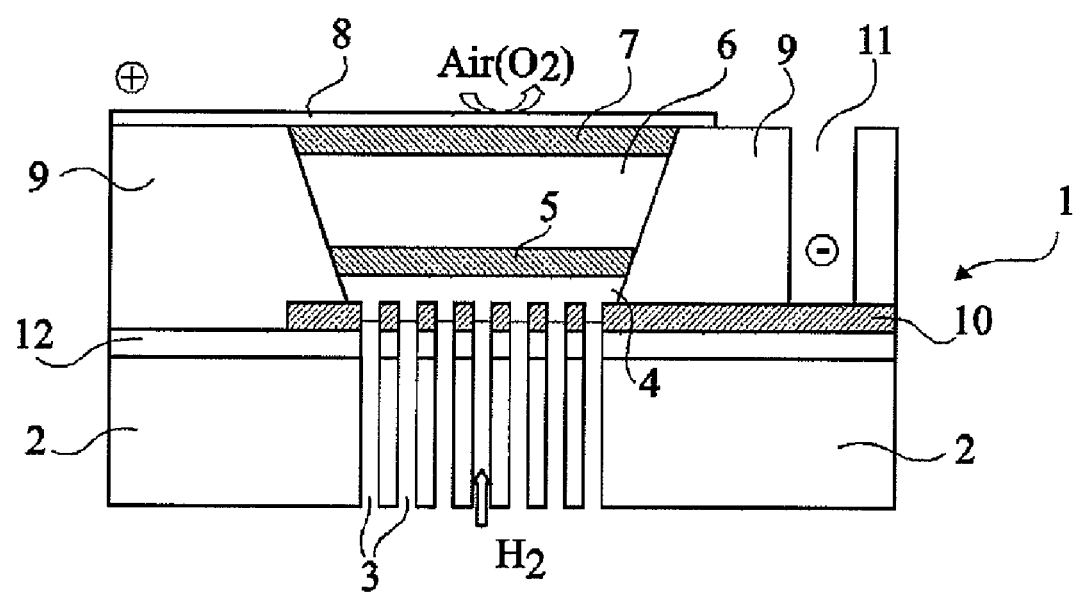
FIG. 1 is a simplified cross-section view of a fuel cell element.

For clarity, the same elements have been designated with the same reference numerals in the different drawings and, further, as usual, especially in the representation of integrated circuits, the various drawings are not to scale.

FIG. 1 is a simplified cross-section view of an example of a fuel cell 1. On a silicon substrate 2 are successively deposited an insulating layer 12, an anode layer 10, and an insulating layer 9 in which is located a housing within which a catalyst support 4, a catalyst layer 5, an electrolyte layer 6, a catalyst layer 7, and a cathode electrode 8 can be successively found. An opening 11 is formed in insulating layer 9 to form an electric contact on anode 10. Silicon layer 2, insulating layer 12, and anode layer 10 have micro-channels 3 running through them which reach the catalyst support, these micro-channels being intended to feed the cell core with fuel. The upper surface of this element, at the level of cathode 8, is permeable to the fluid containing oxygen, generally air. For its use, this element will preferably be arranged to enable arrival of fuel on its lower surface, for example, hydrogen, and of comburant on its upper surface, for example, air and/or oxygen.

Figure 2:
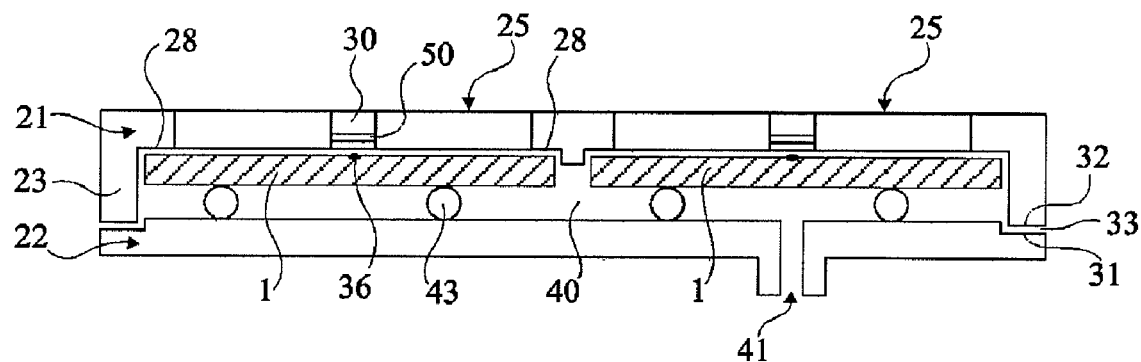
FIG. 2 is a simplified cross-section view of a package for a fuel cell according to an embodiment of the present invention.
Figure 3:
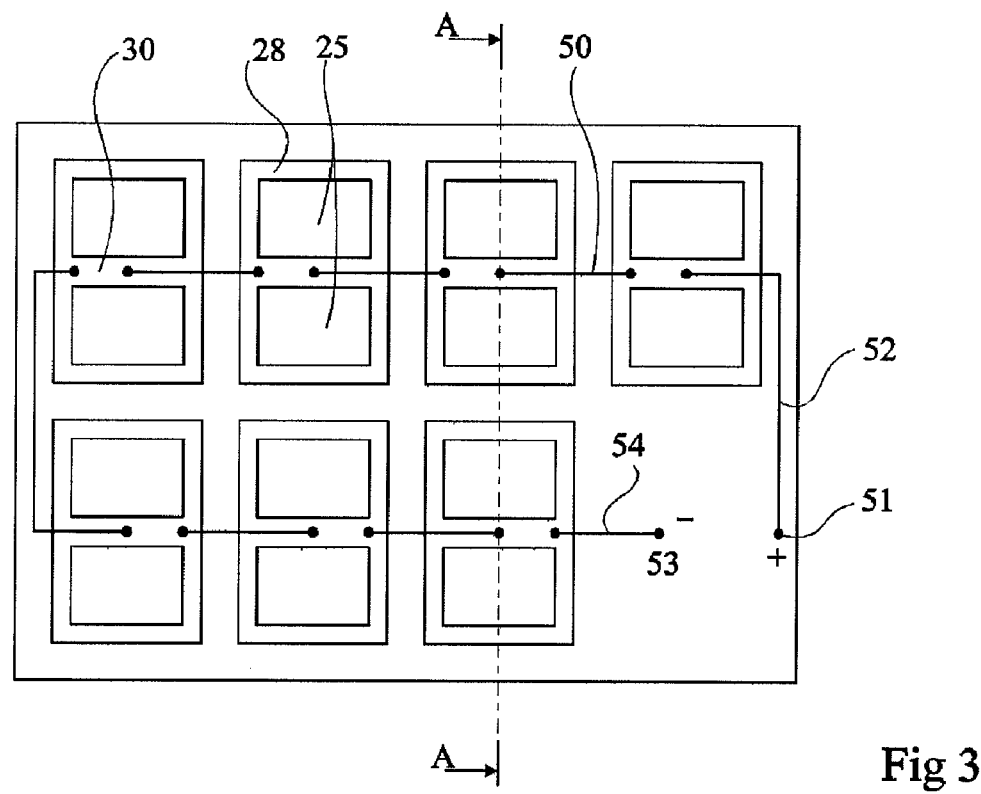
FIG. 3 is a bottom view of the upper plate of the package seen in cross-section view in FIG. 2.

FIGS. 2 and 3 illustrate a package according to an example of embodiment of the present invention, FIG. 2 being an enlarged cross-section view along plane A-A of FIG. 3. The package comprises an upper plate 21, a lower plate 22, and a peripheral edge 23 solid with the upper plate and/or with the lower plate. Upper plate 21 comprises a plurality of openings 25, these openings being of rectangular shape in the shown embodiment, but being able to have any other adapted geometric shape.

Each opening 25 is divided by a crossbar 30 which connects two opposite sides of opening 25. A cell element 1 is received under the contour of each of openings 25. The cell element bears against an edge 28 formed in plate 21 around opening 25. To improve the mechanical strength and the tightness of the assembly, it will preferably be provided at the level of edge 28 to attach cell element 1 and the upper plate with a glue or any other adequate attachment element. The housing formed between upper and lower plates 21 and 22 has a height greater than the thickness of each cell element 1.

Lower plate 22 is placed under peripheral edge 23 of upper plate 21, for example, at the level of bearings 31 on the lower plate and 32 on peripheral plate 23.

Between the upper surface of lower plate 22 and the lower surface of upper plate 21 is delimited a volume 40 which needs to be sufficient to incorporate cell elements 1 while leaving a sufficient space to introduce and store hydrogen or a fluid capable of generating hydrogen (or fuel in general) which is introduced into this volume 40 via an access port 41 formed in the present example through lower plate 22. To ensure the mechanical stiffness and the tightness necessary to the operation of the fuel cell device, upper plate 21 and its edge 23 are attached to lower plate 22 by means, for example, of a glue or any similar element 33 between bearings 31 and 32. For a better mechanical strength of the package, spacers 43 may for example be provided under the cell elements.

FIG. 3 schematically illustrates a possible interconnection of the different cell elements assembled within the package in which all the cell elements are assembled in series. As an example, it will be considered that the cell elements are wafers having a thickness on the order of one millimeter and sizes on the order of one centimeter, for example, a width ranging between 0.5 and 1 cm and a length ranging between 1 and 2 cm, such elements being square or rectangular, preferably rectangular. It is also considered that each cell element comprises a substantially central pad 36 and a pad arranged along one of its edges, not shown in the drawings. One of these pads corresponds to the positive terminal of the cell and the other one corresponds to the negative terminal. Of course, other configurations may be adopted, where each cell element may comprise one or several positive pads and one or several negative pads.

According to an aspect of the present invention, conductive track portions are formed in upper plate 21, portions at least of at least some of these conductive track portions extending on crossbars 30 to come into contact with pads arranged in substantially central fashion on the cell elements. In FIG. 3, upper plate 21 has been shown as seen from underneath, that is, edges 28 in which each of the cell elements will be placed can be seen. Conductive track elements 50 are arranged, by partially extending on crossbars 30 between the negative pad of a cell and the positive pad of a cell and the positive pad of an adjacent cell.

A positive terminal 51 of the cell is connected to a first cell element by a conductor 52 and a negative terminal 53 of the cell is connected to the end cell element by a track portion 54.

It will be within the abilities of those skilled in the art to adapt the above embodiment to cases in which the cell elements are interconnected according to various series/parallel connections.

As will be seen hereafter, various means may be provided to form track elements 52. For example, they are formed on the lower surface of the wafer, where the portions should not be in contact with the terminals of a cell element being coated with an insulator. Many other embodiments are, however, possible as will be seen hereafter. The contact between the end of a track portion and the corresponding pad of a cell element placed under will preferably be ensured by a drop of conductive glue. Thus, according to an advantage of an embodiment of the present invention, the contacts are directly taken with the terminals of each cell element, without it being necessary to weld intermediary wires and/or strips. Any other adapted connection method may be used (welding, microball, microbump . . . ).

A free space in the upper plate of the package has been shown at the location of terminals 51 and 53. It should be noted by those skilled in the art that any electronic component intended for the management of the cell elements may be arranged at this location, for example to ensure the switching, current-limiting, voltage-limiting, or other functions.

Different methods for forming this upper plate are possible. According to an embodiment, the upper plate will comprise at least two layers of a same material or of different materials between which an appropriate network of conductive tracks will be sandwiched. Two half-openings will then be formed through the upper layer (for example, by milling) and separated by the corresponding crossbar, while the full corresponding opening will be formed through the lower layer by thus exposing the electric connection portion arranged under the crossbar. It is of course possible to provide a multiple-layer interconnection system (for example, respectively alternated n conductive tracks and n+1 insulating layers) with openings comprising or not crossbars according to the pattern selected for the tracks.

The different embodiments described hereabove are likely to have various alterations, improvements, and modifications which will readily occur to those skilled in the art. The upper plate may be made of any material, preferably insulating or covered with an insulating layer, especially made of plastic matter or of epoxy, of a sufficient thickness and/or stiffness for the use for which it is intended and will preferably be impermeable or of very low permeability. The shape of this plate will for example be that of a credit card. To obtain all of these properties, especially when the required impermeability criterion is of high level, a plurality of stacked sheets preferably attached to one another may for example be provided, each sheet fulfilling one of the required functions.

The crossbar provided in each opening preferably ensures a stiffening of the package while forming the support of a discontinuous conductive track, for example, made of copper, aluminum, gold, platinum, etc., each track being located under this crossbar which thus protects it.

The openings will have dimensions smaller than those of the fuel cell element, said element being inserted into the package preferably under said upper plate, to preferably totally obstruct said opening, the element surface receiving the gas containing oxygen being preferably oriented towards the outside of the package, to be in particular in contact with the ambient air if said air is the oxygen-containing gas used by the cell. Such a positioning of course ensures the tightness in general necessary to avoid the passing of the other fluid (for example, the gas containing hydrogen) which feeds the other surface of the element. This tightness may be enhanced by different additional elements which may be used alone or in combination:

each opening may be provided on its lower surface with a groove preferably arranged all around the opening, of a sufficient width for the corresponding cell element to thus bear against this groove;

a glue (or any other attachment element performing the same function) will preferably be provided all around the element and/or all around the opening edge to attach and preferably seal according to the imposed specifications the junction between the cell element and the upper plate;

the fluid containing or generating hydrogen will preferably be maintained under pressure at the contact of the lower portion of the cell element. This overpressure by placing the cell element against the edge of its opening will contribute to improving the tightness between the two elements.

Generally speaking again, given the presence of oxygen- and/or hydrogen-containing fluids close to or inside of the package, it will often be useful, in particular for security reasons, to select antistatic materials (especially to form the upper plate, the walls and/or the lower plate).

The lower plate will generally have a shape similar to that of the upper plate and formed of the same material or of one of the materials envisaged for the upper plate since the lower plate generally does not have the electric insulator function exhibited by the upper plate according to the described example of embodiment.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A package for a fuel cell comprising an upper plate having a plurality of pairs of openings, each of the pair of openings receiving the front surface of a common cell element to close the pair of openings, each cell element having a first connection pad and a second connection pad, each of the pair of openings being provided with at least one crossbar connecting two sides of the pair of openings, this crossbar having at least a conductive track portion having a first end connected to a pad of a first cell element and having a second end connected to a pad of a neighboring cell element.

2. The package of claim 1, wherein the package includes a lower plate having an access port and that mates with the upper plate to define a space therebetween that is closed to an external environment.

3. The package of claim 1, wherein the pads and the ends of the conductive track portions are connected by a conductive glue.

4. The package of claim 1, wherein the upper plate is formed of two wafers of a plastic material between which the conductive tracks are sandwiched.

5. A fuel cell comprising the package of claim 1 and a plurality of cell elements serially connected by said conductive tracks.

6. The fuel cell of claim 5, wherein each cell element is glued under the corresponding opening.

7. The fuel cell of claim 5, comprising at least one holding spacer under at least one of the cell elements.

8. A package for a fuel cell comprising:
    an upper plate having a plurality of pairs of openings with a crossbar positioned between openings of each pair;
    a lower plate that mates with the upper plate to define spaces within the package to hold cell elements, each of the spaces positioned beneath a corresponding pair of openings such that a cell element, when positioned in the space, will close the corresponding pair of openings; and
    conductive track portions that connect, in series, cell elements associated with each of the plurality of pairs of openings, the conductive track portions extending to the cell elements through crossbars of each of the plurality of pair of openings.

9. The package of claim 8, wherein each of the plurality of crossbars has a first pad and a second pad and each of the plurality of conductive track portions connect to a first pad of one of the plurality of crossbars and to a second pad of an adjacent one of the plurality of crossbars.

10. The package of claim 9, wherein the plurality of conductive track portions are connected to the first and second pads with a conductive glue.

11. The package of claim 8, wherein the lower plate includes an access port through which fuel fluid may be supplied to cell elements in the package.

12. The package of claim 8, wherein the upper plate is formed of two wafers of a plastic material between which the plurality of conductive track portions is sandwiched.

13. A fuel cell comprising the package of claim 8 and a plurality of cell elements, each of the plurality of cell elements associated with one of the plurality of pairs of openings and connected in series by the plurality of conductive track portions.

14. The fuel cell of claim 13, wherein each of the plurality of cell elements is glued in position under the associated pairs of openings.

15. The fuel cell of claim 13, further comprising one or more spacers positioned between at least some of the plurality of cell elements and the lower plate.

* * * * *